(12) United States Patent
Clark et al.

(10) Patent No.: US 10,528,996 B2
(45) Date of Patent: Jan. 7, 2020

(54) SHOPPING CART FOR VISION-IMPAIRED USERS

(71) Applicant: Walmart Apollo, LLC, Bentonville, AR (US)

(72) Inventors: Jimmie R. Clark, Fayetteville, AR (US); Louis Page, Sunnyvale, CA (US); Ashlie Sierra Page, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 158 days.

(21) Appl. No.: 15/674,747

(22) Filed: Aug. 11, 2017

(65) Prior Publication Data

US 2018/0053231 A1    Feb. 22, 2018

Related U.S. Application Data

(60) Provisional application No. 62/375,577, filed on Aug. 16, 2016.

(51) Int. Cl.
*G06Q 30/00* (2012.01)
*G06F 17/30* (2006.01)
(Continued)

(52) U.S. Cl.
CPC ....... *G06Q 30/0613* (2013.01); *G01C 21/206* (2013.01); *G06K 7/10386* (2013.01);
(Continued)

(58) Field of Classification Search
CPC .................................................. G06Q 30/0613
See application file for complete search history.

(56) References Cited

U.S. PATENT DOCUMENTS

| 7,283,093 B2 | 10/2007 | Do et al. |
| 8,749,389 B2 | 6/2014 | Kamen |

(Continued)

FOREIGN PATENT DOCUMENTS

CN    202453770 U    9/2012

OTHER PUBLICATIONS

Gharpure, Chaitanya, et al., "Robot-Assisted Shopping for the Blind: Issues in Spatial Cognition and Product Selection," Computer Science Assistive Technology Laboratory, Department of Computer Science, Utah State University, http://citeseerx.ist.psu.edu/viewdoc/download?doi=10.1.1.128.1434&rep=rep1&type=pdf, June.*

(Continued)

*Primary Examiner* — Kathleen Palavecino
(74) *Attorney, Agent, or Firm* — Schmeiser, Olsen & Watts LLP (57) ABSTRACT

A shopping cart comprises a shopping cart body and a handle coupled to the shopping cart body. The handle includes a haptic feedback device for providing haptic feedback when the shopping cart body is in motion and a speaker that provides audio feedback when the shopping cart body is in motion along a navigation path at which an item of interest is positioned. The shopping cart further comprises an object detection device for detecting objects along the navigation path in communication with the haptic feedback device and/or the speaker for providing feedback or audio feedback, respectively. A navigation device identifies the navigation path to the item of interest. A special purpose processor processes a shopping list application that includes the item of interest, and communicates with the navigation device to determine the navigation path at which the item of interest is positioned.

20 Claims, 6 Drawing Sheets

(51) Int. Cl.
    *G06Q 30/06*    (2012.01)
    *G01C 21/20*    (2006.01)
    *G06K 7/10*     (2006.01)
    *G06K 9/00*     (2006.01)
    *G06K 9/78*     (2006.01)
    *G01S 17/02*    (2006.01)
(52) U.S. Cl.
    CPC .......... *G06K 9/00624* (2013.01); *G06K 9/78* (2013.01); *G06Q 30/0633* (2013.01); *G06Q 30/0639* (2013.01); *G01S 17/02* (2013.01); *G06K 7/10861* (2013.01)

(56) References Cited

U.S. PATENT DOCUMENTS

| | | |
|---|---|---|
| 9,243,918 B2 | 1/2016 | Goldman et al. |
| 2004/0128069 A1 | 7/2004 | Cato et al. |
| 2006/0293968 A1 | 12/2006 | Brice et al. |
| 2008/0042489 A1 | 2/2008 | Lewis et al. |
| 2008/0230603 A1 | 9/2008 | Stawar et al. |
| 2008/0308630 A1 | 12/2008 | Bhogal et al. |
| 2012/0296751 A1 | 11/2012 | Napper |

OTHER PUBLICATIONS

International Search Report & Written Opinion in International Patent Application No. PCT/US17/46447, dated Oct. 25, 2017; 11 pages.

International Preliminary Report on Patentability in PCT/US2017/046447 dated Feb. 28, 2019; 10 pages.

Jethava, Hiren, et al. "Electronic Shopping Cart Facility for Blind People Using USB Firmware," International Journal of Emerging Technology abd Advanced Engineering, Jun. 2014, vol. 4, issue 6, pp. 647-651.

Fadilah, Norasyikin "Smart Shopping Cart," Innovative Retail Laboratory, Oct. 16, 2007, 12 pages.

Robotnews, "RoboCart: Grocery shopping solution for the visually impaired," RobotNews.Wordpress.com, Mar. 14, 2006.

T.Shanmugapriyan, "Smart Cart to Recognize Objects Based on User Intention," International Journal of Advanced Research in Computer and Communication Engineering, May 2013, volumber 2, issue 5, pp. 2049-2053.

"Frontier for shopping carts," Front-Technologies.com, accessed Dec. 2, 2015.

Fincher, Jonathan "Kinect grocery cart follows shoppers around the store," GizMag.com, Mar. 5, 2012.

Elgendy, Mostafa, et al., "Making Shopping Easy for People with Visual Impairment Using Mobile Assistive Technologies," Applied Sciences, vol. 9, Issue 6, 2019, 1061, https://doi.org/10.3390/app9061061, Mar. 13, 2019.

Gharpure, Chaitanya, et al., "Robot-Assisted Shopping for the Blind: Issues in Spatial Cognition and Product Selection," Computer Science Assistive Technology Laboratory, Department of Computer Science, Utah State University, http://citeseerx.ist.psu.edu/viewdoc/download?doi=10.1.1.128.1434&rep=rep1&type=pdf, Jun. 27, 2019.

* cited by examiner

SHOPPING CART FOR VISION-IMPAIRED USERS

RELATED APPLICATIONS

This application claims the benefit of U.S. Provisional Patent No. 62/375,577, filed Aug. 16, 2016, entitled "Shopping cart for Vision-Impaired Users," the contents of which are incorporated by reference herein in their entirety.

FIELD

The present concepts relate generally to solutions for assisting vision-impaired shoppers, and more specifically, to a movable vehicle such as a shopping cart configured to assist shoppers having vision disabilities to navigate to items of interest in a store.

BACKGROUND

People with special needs, such as those who are vision-impaired, often experience difficulty navigating the aisles of a store and locating items in the store.

BRIEF SUMMARY

In one aspect, a shopping cart comprises a shopping cart body and a handle coupled to the shopping cart body. The handle includes at least one of: at least one haptic feedback device for providing haptic feedback when the shopping cart body is in motion; and a speaker that provides audio feedback when the shopping cart body is in motion along a navigation path at which an item of interest is positioned. The shopping cart further comprises an object detection device for detecting objects along the navigation path, the object detection device in communication with the at least one of the at haptic feedback device and the speaker for providing feedback or audio feedback, respectively; a navigation device that identifies the navigation path to the item of interest; and a special purpose processor that processes a shopping list application that includes the item of interest, wherein the special purpose processor communicates with the navigation device to determine the navigation path at which the item of interest is positioned.

In some embodiments, the object detection device comprises at least one of a camera or a Light Detection and Ranging (LIDAR) device.

In some embodiments, the shopping list application includes a plurality of items, and wherein the special purpose processor plots a route along the navigation path to each of the items on the shopping list.

In some embodiments, the navigation device communicates with remote a navigation system to determine a current location of the shopping cart relative to the item of interest.

In some embodiments, the shopping cart further comprises a scanner for identifying the item of interest.

In some embodiments, the scanner includes a barcode scanner or a radio frequency identification scanner for identifying a specific location of the item of interest after the shopping cart is positioned in a general region of the item of interest.

In some embodiments, the scanner includes an object recognition device for identifying objects along the navigation path.

In some embodiments, the shopping cart further comprises a braille keyboard, a braille screen, or a text to speech processor for presenting the shopping list application to a vision-impaired user of the shopping cart.

In some embodiments, the special purpose processor generates a new navigation path and plot to the items on the list when one of the items on the list is identified prior the shopping cart reaching the item of interest to which the navigation path is generated.

In another aspect, a system for navigating a movable apparatus comprises a location of the movable apparatus and a mobile electronic device. The location includes at least one haptic feedback device for providing haptic feedback when the movable apparatus is in motion; a speaker that provides audio feedback when the movable apparatus is in motion along a navigation path at which an item of interest is positioned; an object detection device for detecting objects along the navigation path, the object detection device in communication with at least one of the at haptic feedback device and the speaker for providing feedback or audio feedback, respectively; a navigation device that identifies the navigation path to the item of interest; and a special purpose processor that communicates with the navigation device to determine the navigation path at which the item of interest is positioned. The mobile electronic device that stores and processes a list of items of interest, wherein the mobile electronic device provides the list to the special purpose processor.

In some embodiments, the object detection device comprises at least one of a camera or a Light Detection and Ranging (LIDAR) device.

In some embodiments, the shopping list application includes a plurality of items, and wherein the special purpose processor plots a route along the navigation path to each of the items of the list.

In some embodiments, the navigation device communicates with remote a navigation system to determine a current location of the movable apparatus relative to the item of interest.

In some embodiments, the movable apparatus further comprises a scanner for identifying the item of interest.

In some embodiments, the scanner includes an object recognition device for identifying objects along the navigation path.

In another aspect, a method for navigating a user in a store comprises electronically generating a route between items of interest at a store; and generating navigation queues for directing the user in at least one of an audio and a tactile feedback format.

In some embodiments, the method further comprises generating the route from a shopping list downloaded to a movable apparatus, which includes data regarding the items of interest.

In some embodiments, the shopping list is stored at a mobile electronic device, and wherein the method further comprises synchronizing the mobile electronic device and the movable apparatus.

In some embodiments, the navigation queues are generated from at least one haptic device and an audio device on a movable apparatus.

In some embodiments, the method further comprises detecting an object along the route; and navigating the user according to an alternate route by generating navigation queues that redirect the user to the item of interest according to the alternate route.

In some embodiments, the method further comprises distinguishing the item of interest from other items at a location of the item of interest, including providing audio feedback that directs the user to the precise location of the item of interest.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill in the art that the systems and methods can be practiced without at least some of the details. In some instances, known features or processes are not described in detail so as to not obscure the present invention.

Figure 1A:
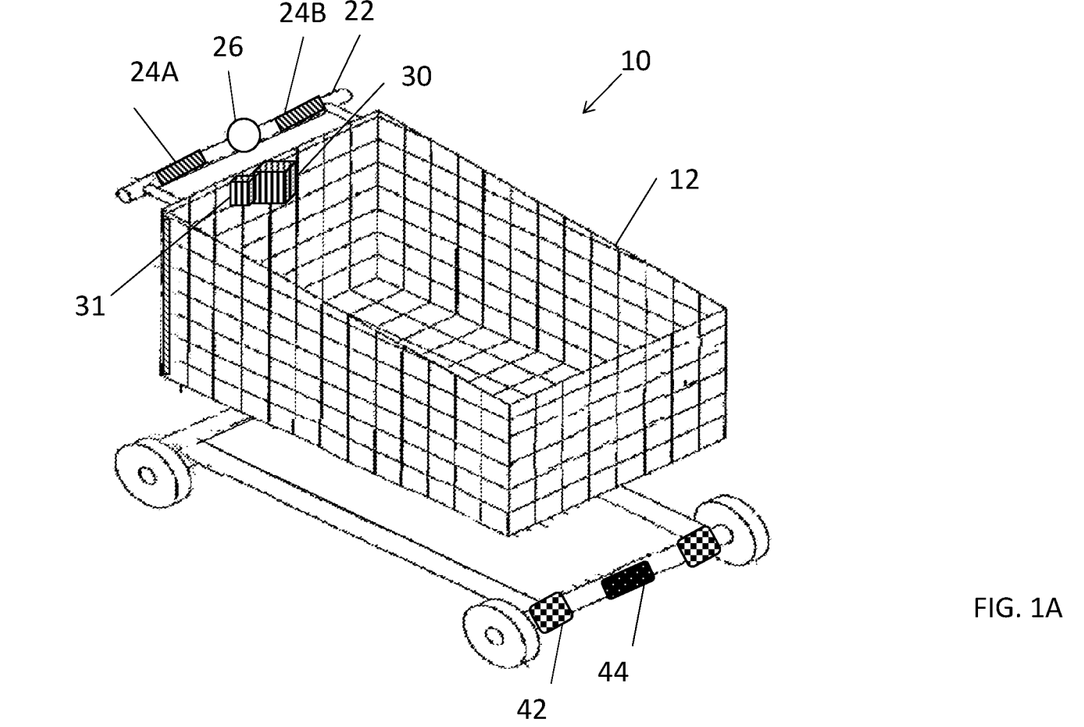
FIG. 1A is a perspective view of a shopping cart, in accordance with some embodiments.
Figure 1B:
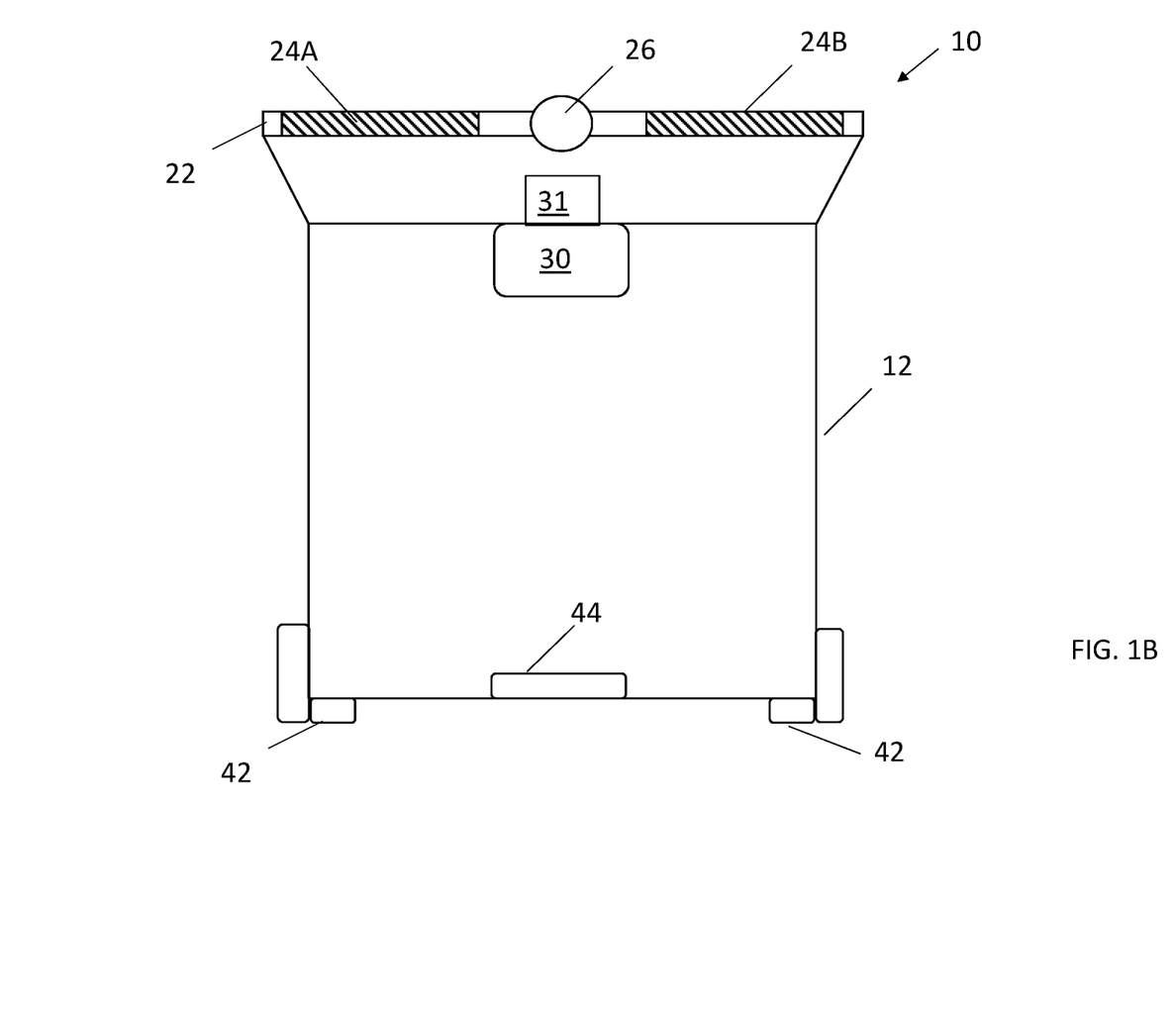
FIG. 1B is a top view of the shopping cart of FIG. 1A.

FIG. 1A is a top view of a shopping cart 10, in accordance with some embodiments. FIG. 1B is a perspective view of the shopping cart 10 of FIG. 1A.

The shopping cart 10 includes a cart body 12 and a handle 22. The cart 10 is constructed and arranged to receive and hold items for purchase, and in doing so, is formed of well-known components such as a handle, basket, wheels, and base.

At least one haptic feedback device 24A, 24B (generally, 24) is positioned at a location on the handle 22 where a user's hand may grasp the handle 22. Accordingly, contact made by the user's hand and the haptic feedback device 24 permits haptic feedback to be generated, in particular, when the shopping cart 10 is in motion. The haptic feedback may be used to provide audio and/or physical navigation queues, either alone or in combination with other devices on the shopping cart 10. For example, haptic feedback generated at the haptic feedback devices 24 may be used to navigate a vision-impaired shopper about the store and cause the handle 22 to vibrate when the user 11 moves within a predetermined proximity of an obstacle in front of the shopping cart 10.

A speaker 26 may be positioned on the shopping cart 10, for example, on the handle 22 between a left haptic device 24A and a right haptic device 24B, but not limited thereto. The speaker 26 can output audio queues, which may be provided in addition to or instead of haptic feedback provided by the haptic devices 24.

One or more cameras 42 may be positioned on the shopping cart for detecting obstacles in the path along which the shopping cart 10 travels. Alternatively, or in addition, a detection system 44 such as a Light Detection and Ranging (LIDAR) system or related laser range finding system, may be positioned on the shopping cart. The cameras 42 and detection system 44 provide collected inputs from object detection to a shopping cart computer 30 which may produce an alarm signal used by the haptic devices 24 and/or speaker 26 to generate a notification, queues, direction instruction, alarm, and/or other information.

For example, the cameras 42 and detection system 44 may process map data and navigation data to reroute a shopping cart user in the event that an object is detected in the path of the shopping cart. When the predetermined route to a location is determined to be blocked, the system will alert the user through sound and/or haptic feedback that the path has been blocked. The user would then decide to either turn around, which the system would interpret as a "reroute" and recompute the path, or the user may be informed of the option to wait until the path is cleared, for example, by removal of the obstruction.

The shopping cart computer 30 communicates between the other electronic devices on the shopping cart 10, such as the haptic devices 24, speaker 26, sensors (e.g., cameras) 42, and detection system 44, and remote electronic devices such as a GPS navigation system, mobile electronic device 15, WiFi network, data repositories, and so on.

In some examples, the shopping cart computer 30 may process a user's shopping list from a smart device, and plot the location of each item on a map of the store. The shopping cart computer 30 may include an item route processor (not shown) that stores map information used to guide the user 11 throughout the store 10 to purchase items. Then, using the user's location as a starting point, the computer 30 will plot a "best path" through the store to allow the user to get each item. While the user 11 navigates about the store, the computer 30 will use information from the sensors 42, 44 to guide the user 11 along the path, and around obstacles using the haptic feedback 24 and sound devices 26. Once the user 11 is near an item 17 of interest, i.e., on the shopping list, to collect, the shopping cart computer 30 will help guide the user 11 to the correct location on the shelf 29 using the same output sensors.

The shopping cart computer 30 may include a braille keyboard, a braille screen, or other peripheral devices for use by a vision-impaired user. The shopping cart computer 30 may therefore operate to perform functions in place of or addition to the mobile electronic device 15 after the mobile electronic device 15 is synchronized with the computer 30.

An interface 31 may permit the computer 30 to communicate with a remote device such as the user's mobile electronic device 15, for example to perform a sync operation where a shopping list or other data may be output from the mobile electronic device to the shopping cart computer 30. In another example, store map and item location data may be output from the store computer 30 to the mobile electronic device 15. The mobile electronic device 15 may include features for vision-impaired users, such as text-to-speech/speech-to-text, voiceover, special ringtones, and so on.

The computer 30 also includes hardware technology, such as amplifiers, transducers, and so on, for communicating with the haptic device 24 and speaker 26, for example, for converting data to audio and tactile feedback.

Although a shopping cart 10 is shown and described, a system may be provided for navigating other movable apparatuses comprising at least a set of wheels and a storage area for holding groceries or other items of interest, for example, wheelchairs, golf carts, self-powered vehicles, smart carts, and so on, but not limited thereto. For example, the apparatus may not include wheels, and may be related to other movable apparatuses such as aerial vehicles such as drones or the like. Regardless of type of vehicle or movable apparatus in which the system is implemented, the system may include some or all of the haptic feedback device 24, speaker 26, special purpose computer 30, interface 31, mobile electronic device 15, camera 42, and detection system 44.

Figure 2:
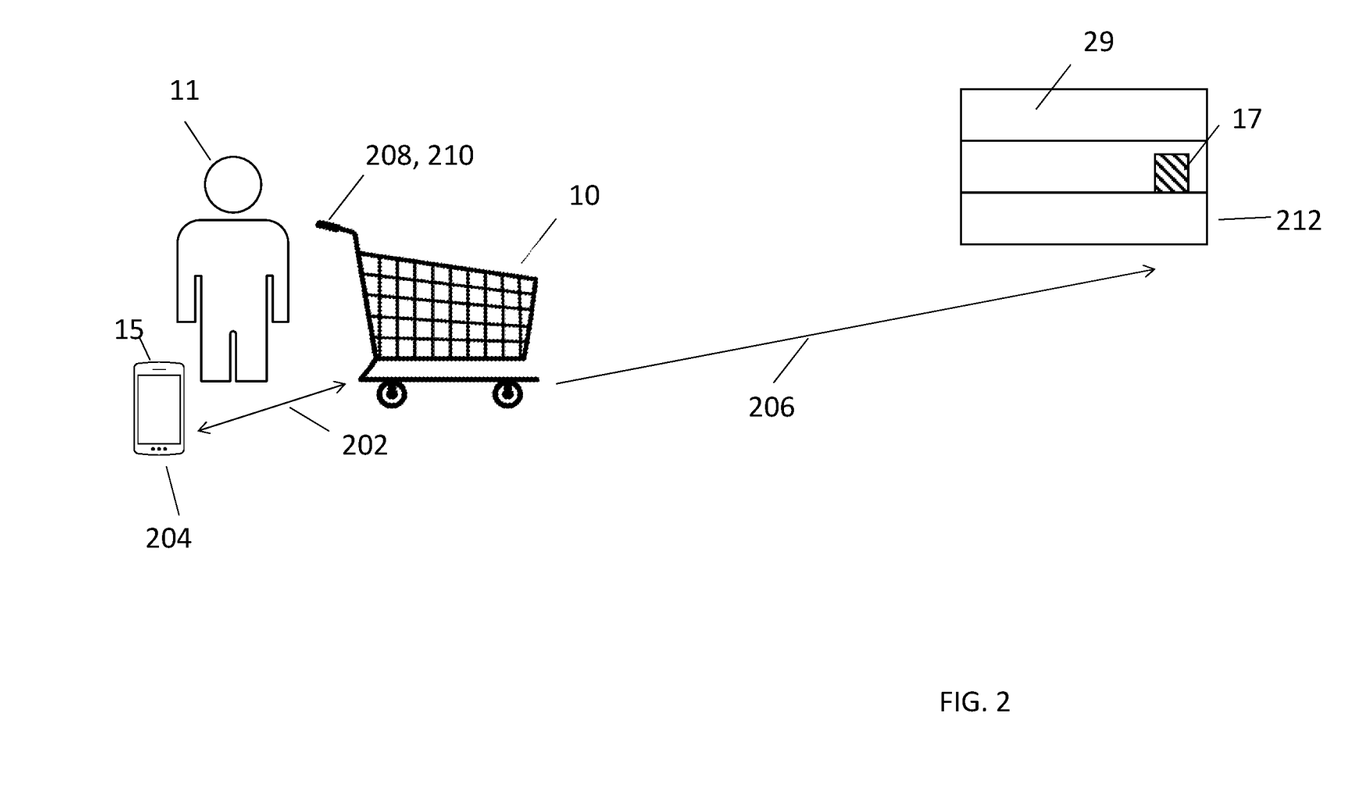
FIG. 2 depicts an example environment and flow diagram where the shopping cart of FIGS. 1A and 1B may operate, in accordance with some embodiments.

FIG. 2 depicts an example environment and flow diagram where the shopping cart 10 of FIGS. 1A and 1B may operate, in accordance with some embodiments.

A vision-impaired shopper 11, also referred to as a shopping cart user, may wish to purchase items at a store. The shopper 11 may sync (202) a mobile electronic device 15 to a shopping cart 10 that the shopper 11 plans to use. The mobile electronic device 15 may be a smartphone, electronic notebook, laptop computer, handheld computer, or the like, and be configured with features for the vision-impaired user 11. After the shopper 11 selects the shopping cart 10, the shopping cart 10 may include an electronic identifier that is transmitted via the interface 31 to the mobile electronic device 15. Alternatively, the cart 10 may include an identification on a tag or other location of the shopping cart, which can be entered into a field presented by the application executed at the mobile electronic device 15 for syncing the mobile electronic device 15 and the shopping cart 10.

The shopping cart interface 31 may communicate with the user's mobile electronic device 15, which may include a shopping list stored electronically in a memory device at the mobile electronic device 15, or stored remotely and retrieved by the mobile electronic device 15. The shopping list may be formed at the store website, at the mobile electronic device 15, or other computer-based location. For vision-impaired users, the shopping list may be dictated and converted into a digital format using speech recognition technology or the like for storage and subsequent use by the shopping cart 10.

The mobile electronic device 15 may include an application that communicates (204) with the shopping cart interface 31 to provide the shopping list to the computer 30. The application can be used to remove items from the shopping list and communicate with the shopping cart computer 30, which can plot a route through a facility such as a store from a current location to the items 17. For example, the shopping cart computer 30 may combine the known location of the item 17 (for example, retrieved from a store database) with the store map and GPS information provided by the mobile electronic device 15 to determine the route to the item 17, and to collect in real-time a current location of the shopping cart 10 to establish whether the shopping cart 10 is following the plotted route. Any deviations from the plotted route may result in an alarm signal being generated, which in turn is provided to the haptic devices 24 and/or speaker 26. Such deviations may also trigger the shopping cart computer 30, or remote processor in communication with the shopping cart computer 30, to generate a new, or rerouted, path to the item 17.

In addition, the system can detect when the shopping cart 10 is moved within a proximity of another or different item on the list, although it is farther down in the order of items with respect to the predetermined path. Here, the shopping cart computer 30 can automatically recalibrate to guide the user 11 to the other item on the list. After the item is acquired, then the shopping cart computer 30 may resume directly the user 11 to the other items in the list according to the original plotted route. In other words, the system can detect when the customer is in proximity of a different item on the shopping list and "switch" to guiding the customer to the newly identified item. Here, the shopping cart computer 30 that computes the customer's path through the store may continue to track multiple item locations in the store and can compute when the shopping cart moves within a range of the item that is determined to be feasible, for example, due to the customer being closer to the item than to other items on the shipping list, whereby the customer is routed to the closer item.

Figure 4:
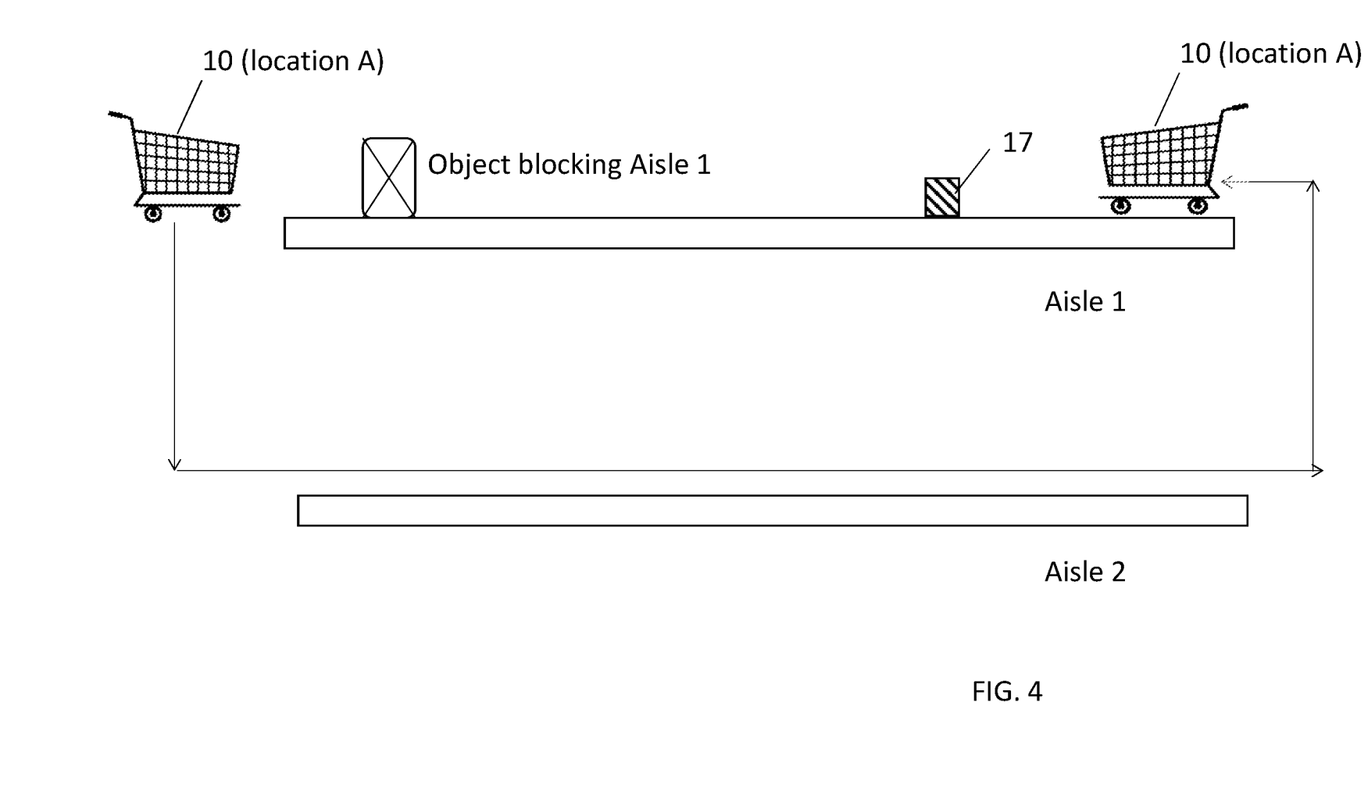
FIG. 4 is a view of an example operation of a smart shopping cart, in accordance with some embodiments.

As the cart 10 moves toward the item of interest 17, sensors on the cart 10 such as cameras 42, laser range finding system 44, and so on are activated to detect (206) obstacles in a path along with which the cart 10 moves. Such obstacles may include other shoppers, store associates, carts, items, or other physical objects. For example, as shown in FIG. 4, the cameras 42 and/or laser range finding system 44 may detect an unknown object in Aisle 1. The computer 30 may automatically determine an alternate route to the shopping list item 17 in Aisle 1, for example, by identifying a path through Aisle 2 to the other unblocked end of Aisle 1.

The handlebar haptic devices 24 may provide (208) tactile feedback in the form of a physical navigation queue, by recreating the sense of touch by applying forces, vibrations, or motions to the user when a hand is placed on or near a haptic device 24. In addition, or alternatively, the speaker 26 may provide (210) audio feedback, for example, verbal queues providing turn-by-turn directions. For example, referring again to the example operation of FIG. 4, the user may receive audio and/or tactile feedback to redirect the shopping cart 10 to back up and take Aisle 2 to the other end of Aisle 1.

Once the shopper 11 and cart 10 are at or near the location of the item 17, for example, at a store shelf 29, the handlebar haptic devices 24 and/or speaker 26 may be used to notify (212) the shopper 11 of the location of the item 17, for example, the specific location on the shelf 29, for example, distinguished from other items on the same or different rows of the shelf 29. Similar to a Geiger counter, haptic or audio feedback can increase in intensity, amplification, reduction in time periods between audio sounds, and so on, as the shopping cart 10 moves closer to the item identified as being at the destination of the predetermined route.

Figure 5:
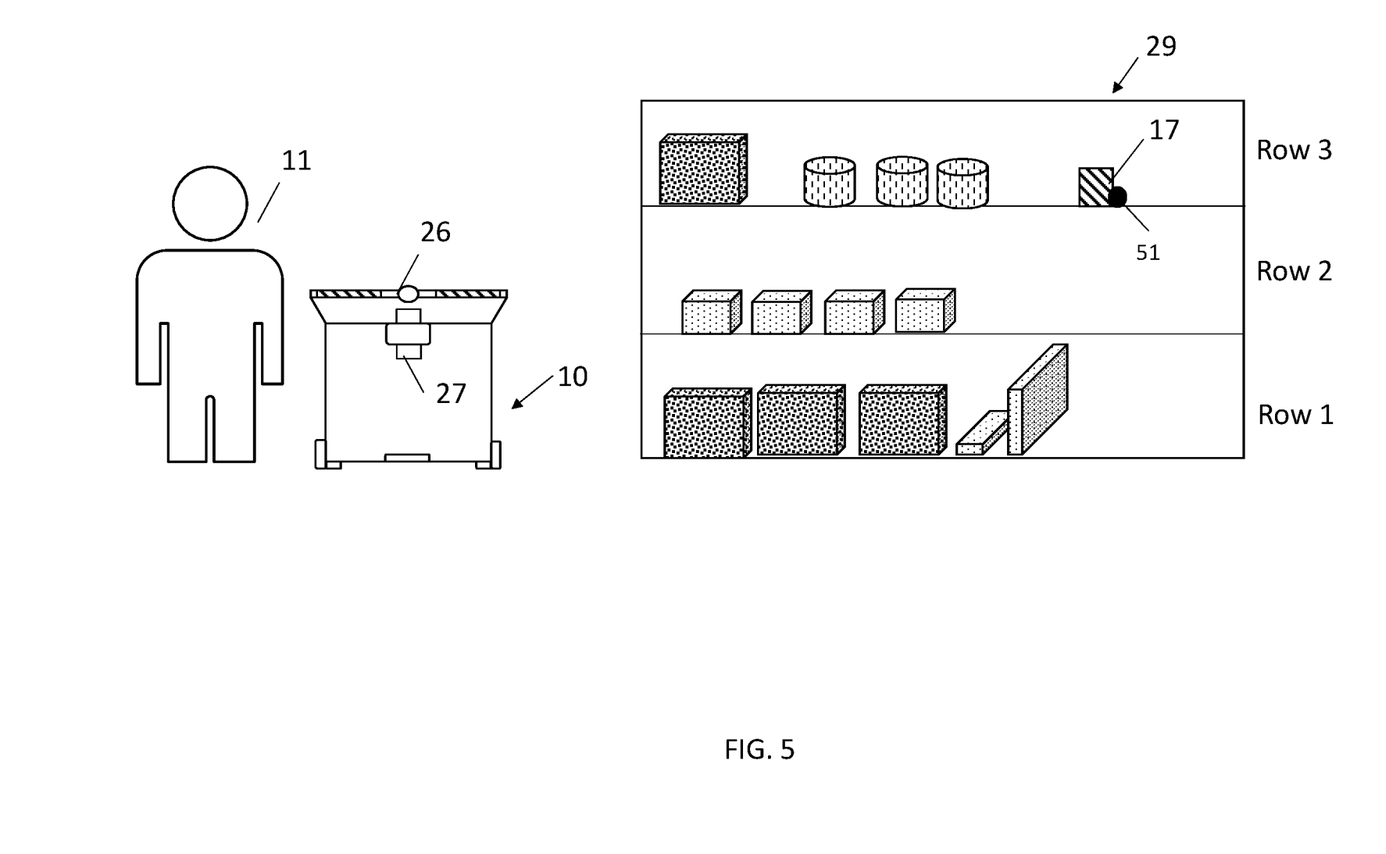
FIG. 5 depicts an example environment and flow diagram where a shopping cart is used to notify a user where on a shelf an item of interest is located, in accordance with some embodiments.

Referring to FIG. 5, the shopping cart 10 may receive location signals, e.g., WiFi signals or the like, used by the shopping cart computer 30 and/or mobile electronic device 15 to determine the precise location of the item 17 on the shelf. In some embodiments, a radio frequency identification (RFID) tag 51 may be located on the item 17, and the shopping cart 10 may include an RFID detector 27 or the like that detects the RFID tag 51. This permits the user 11 to locate a store product closest to the user as some products are in different locations in the store or misplaced, i.e., placed somewhere by another customer. Wi-Fi triangulation, GPS, or other related techniques may be used to determine a proximity from the item 17 on the shelf. Location information is provided to the store computer 30 which in turn activates the haptic device 24 and/or speaker 26 to generate feedback as to where the item is located, for example, until the user 11 can physically retrieve the item 12 from the shelf 29. For example, audio queues may include instructions to "move hand up," "move hand down," "move hand forward," "move hand backward," and so on in order to guide the user to the precise location of the item 17.

In some instances, the store item 17 that should be located at a particular shelf 29 may instead be inadvertently or intentionally moved to a different shelf, and this move may not be known or otherwise identified in the store map, or space allocation system where a record is stored identifying the item 17 as being on shelf 29. Here, an RFID tag on the moved item 17 may emit a signal, which is detected and processed by the shopping cart computer 30 to make corrections to the original navigation path and proximity to the item in view of its new location.

Figure 3:
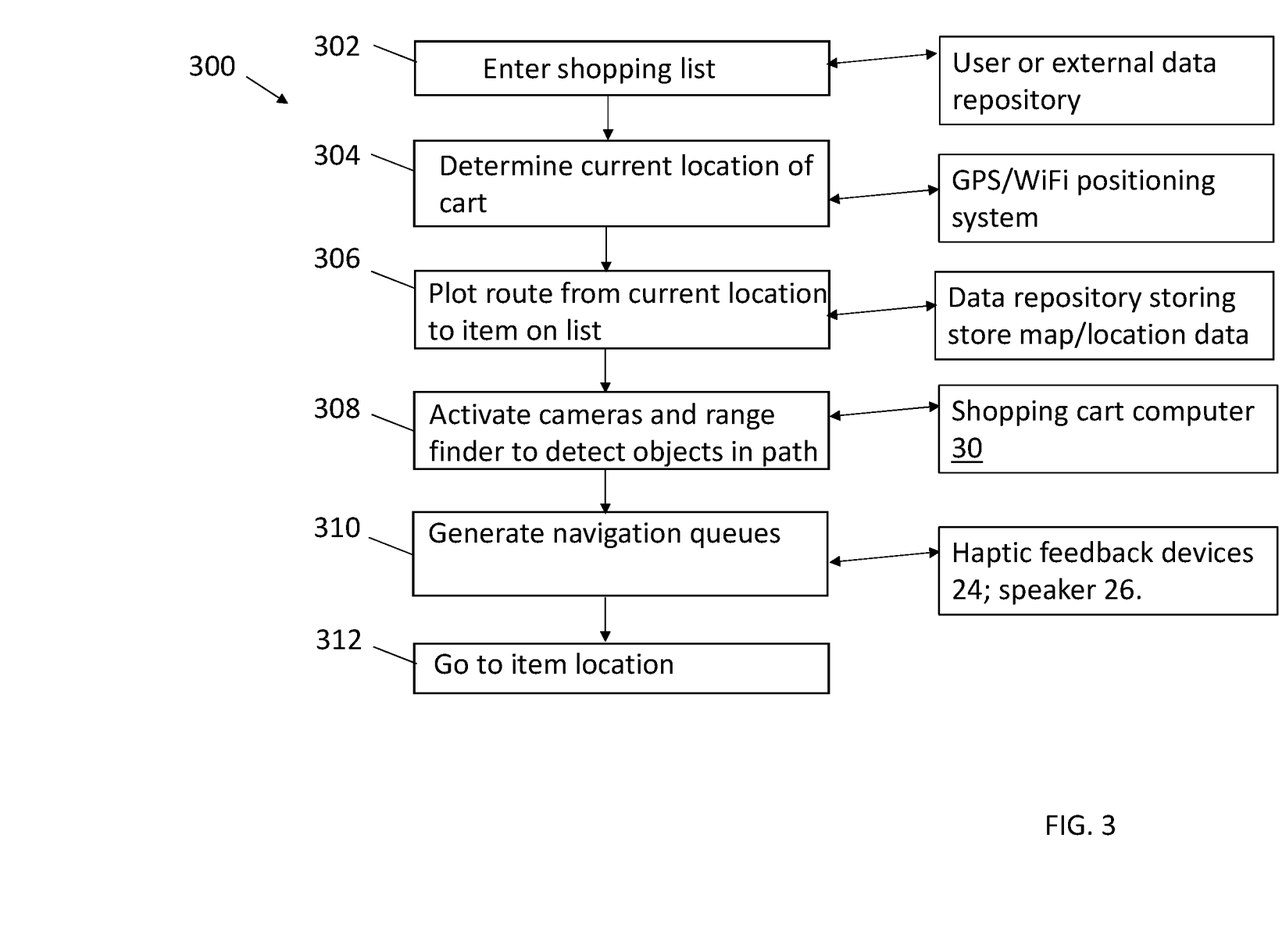
FIG. 3 is a functional schematic diagram of data that is used in conjunction with an operation of a shopping cart for vision-impaired users used for retrieving items in a store, in accordance with some embodiments.

FIG. 3 is a functional schematic diagram of data that is used in conjunction with an operation of a shopping cart for vision-impaired users used for retrieving items in a store, in accordance with some embodiments. Some or all of the method steps may be facilitated by a shopping cart computer 30 described with reference to FIG. 1 in connection with one or more data sources.

At block 302, a shopping list may be entered into the shopping cart computer 30, for example, by synchronizing the user's mobile electronic device 15 with the shopping cart computer 30. In other embodiments, the user may use audio recording technology to verbally recite the shopping list to a microphone (not shown). The computer 30 may include speech-to-text technology to process the shopping list. In other examples, a braille computer or the like may be used to enter the shopping list data for processing by the shopping cart computer 30. In other example, a shopping list may be provided from a store database or other external repository which may store a shopping list prepared by the user. In another example, an analytics engine or other processor may generate a list of items based on historical customer preferences, customer account information, promotions offered by the store, and so on.

At block 304, a current location of the shopping cart 10 is determined. The shopping cart 10 may include a navigation device, for example, GPS or WiFi positioning system, to establish the current location. The store may be configured with sensors positioned throughout the store, for example, for monitoring a location, which may communicate with the shopping cart 10 to determine a location and route to a store item 17. Alternatively, the user's mobile electronic device 15 may provide a location via its GPS or WiFi interface, and the location data may be transmitted from the mobile electronic device 15 to the shopping cart computer 30 for processing.

At block 306, a route is calculated from the current location of the shopping cart to the item of interest, and/or between items of interest, for example, between a first item on a shopping list and a second item on the shopping list. The route may be plotted by the application executed on the user's mobile electronic device, which receives location data from a store computer, data repository, or the like. For example, a data repository may store inventory data that includes a shelf location of store items. A space allocation system may communicate with the data repository to provide set of records that identify locations in a store map layout where items are to be stocked and/or are currently located. The shelf location data and corresponding store map information may be provided from the repository directly to the mobile electronic device 15, or to the shopping cart computer 30, which in turn provides the data to the mobile electronic device for processing in determining a route to the items.

At block 308, the cameras 42 and/or detection system 44 are activated for monitoring the pathway along which the shopping cart 10 moves in the direction of the items identified in the shopping list. The cameras 42 and/or detection system 44 may provide received data, such as image, LIDAR, or the like, to the shopping cart computer 30, which may include object recognition software. If an object, person, or impediment (e.g., liquid spill in aisle) is detected, then the shopping cart computer may generate an alarm or notification signal, which can be used to produce an audible or tactile notification for the shopping cart user 11. For example, a prerecorded audio message may be output to the speaker 26 stating that there is an object in front of the shopping cart 10 and that the user 11 may turn the cart 10 in a right direction to avoid the obstacle, or to stop temporarily, and so on. Comparable tactile messages may be produced at the haptic feedback devices 24, for example, a series of pulses produced at the right handle of the shopping cart that may be felt by the user's right hand indicating that the user may turn the cart 10 in a right direction.

At block 310, general navigation queues may be generated, similar to those previously mentioned, such as a combination of audio and physical notifications. The combination of shopping cart devices such as the sensors 42, 44, haptic feedback devices 24, and speaker 26 can be used to communicate to the user 11 when to move forward, turn left, turn right, and so on.

At block 312, the user 11 directs the shopping cart 10 to the item 17 according to the navigation queues.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While concepts have been shown and described with reference to specific preferred embodiments, it should be understood by those skilled in the art that various changes in form and detail may be made therein without departing from the spirit and scope as defined by the following claims.

What is claimed is:

1. A shopping cart for a vision-impaired user, comprising:
    a shopping cart body;
    a handle coupled to the shopping cart body, the handle including at least one of:
        at least one haptic feedback device for providing haptic feedback when the shopping cart body is in motion; and
        a speaker that provides audio feedback when the shopping cart body is in motion along a navigation path of the shopping cart at which an item of interest is positioned;
    an object detection device for detecting objects along the navigation path, the object detection device in communication with the at least one of the at least one haptic feedback device and the speaker for providing feedback or audio feedback, respectively;
    a navigation device that identifies the navigation path to the item of interest; and
    a special purpose processor that processes a shopping list application that includes the item of interest, wherein the special purpose processor communicates with the navigation device to determine the navigation path at which the item of interest is positioned and to communicate with the at least one haptic feedback device, the speaker, and the object detection device to change the navigation path to a different navigation path of the shopping cart to the item of interest in response to the object detection device detecting an object of the objects along the navigation path, wherein the at least one haptic feedback device provides the haptic feedback that directs the vision-impaired user to the item of interest via the different navigation path.

2. The shopping cart of claim 1, wherein the object detection device comprises at least one of a camera or a Light Detection and Ranging (LIDAR) device.

3. The shopping cart of claim 1, wherein the shopping list application includes a plurality of items, and wherein the special purpose processor plots a route along the navigation path to each of the items on the shopping list.

4. The shopping cart of claim 3, wherein the navigation device communicates with a remote navigation system to determine a current location of the shopping cart relative to the item of interest.

5. The shopping cart of claim 1, further comprising a scanner for identifying the item of interest.

6. The shopping cart of claim 5, wherein the scanner includes a barcode scanner or a radio frequency identification scanner for identifying a specific location of the item of interest after the shopping cart is positioned in a general region of the item of interest.

7. The shopping cart of claim 5, wherein the scanner includes an object recognition device for identifying objects along the navigation path.

8. The shopping cart of claim 1, further comprising a braille keyboard, a braille screen, or a text to speech processor for presenting the shopping list application to a vision-impaired user of the shopping cart.

9. The shopping cart of claim 1, wherein the special purpose processor generates a new navigation path and plot to the items on the list when one of the items on the list is identified prior the shopping cart reaching the item of interest to which the navigation path is generated.

10. A system for navigating a movable apparatus for a vision-impaired user, comprising:
    a location of the movable apparatus that includes:
        at least one haptic feedback device for providing haptic feedback when the movable apparatus is in motion;
        a speaker that provides audio feedback when the movable apparatus is in motion along a navigation path of the shopping cart at which an item of interest is positioned;
    an object detection device for detecting objects along the navigation path, the object detection device in communication with at least one of the at least one haptic feedback device and the speaker for providing feedback or audio feedback, respectively;
    a navigation device that identifies the navigation path to the item of interest;
    a special purpose processor that communicates with the navigation device to determine the navigation path at which the item of interest is positioned and to communicate with the at least one haptic feedback device, the speaker, and the object detection device to change the navigation path to a different navigation path of the shopping cart to the item of interest in response to the object detection device detecting an object of the objects along the navigation path, wherein the at least one haptic feedback device provides the haptic feedback that directs the vision-impaired user to the item of interest via the different navigation path; and a mobile electronic device that stores and processes a list of items of interest, wherein the mobile electronic device provides the list of items to the special purpose processor.

11. The system of claim 10, wherein the object detection device comprises at least one of a camera or a Light Detection and Ranging (LIDAR) device.

12. The system of claim 10, wherein the shopping list application includes a plurality of items, and wherein the special purpose processor plots a route along the navigation path to each of the items of the list of items.

13. The system of claim 10, wherein the navigation device communicates with remote a navigation system to determine a current location of the movable apparatus relative to the item of interest.

14. The system of claim 10, further comprising a scanner for identifying the item of interest.

15. The system of claim 10, wherein the scanner includes the object recognition device for identifying the object along the navigation path.

16. A method for navigating a user in a store, comprising:
electronically generating a route between items of interest at a store; and
generating navigation queues for directing the user in at least one of an audio and a tactile feedback format; and
detecting an object along the route;
navigating the user according to an alternate route by generating navigation queues that redirect the user to the item of interest according to the alternate route, including communicating with at least one haptic feedback device, an audio device, and an object detection device to change the navigation queues of a route to navigation queues of the alternative route to the item of interest in response detecting the object of along the route.

17. The method of claim 16, further comprising:
generating the route from a shopping list downloaded to a movable apparatus, which includes data regarding the items of interest.

18. The method of claim 17, wherein the shopping list is stored at a mobile electronic device, and wherein the method further comprises synchronizing the mobile electronic device and the movable apparatus.

19. The method of claim 16, wherein the navigation queues are generated from the at least one haptic device and the audio device on a movable apparatus.

20. The method of claim 16, further comprising:
distinguishing the item of interest from other items at a location of the item of interest, including providing audio feedback that directs the user to the precise location of the item of interest.

* * * * *